US012603781B2

(12) United States Patent
Oh

(10) Patent No.: US 12,603,781 B2
(45) Date of Patent: Apr. 14, 2026

(54) METHOD OF CONTRACTING RESERVES USING PEDERSEN COMMITMENT AND METHOD OF PROVING RESERVES USING ZERO-KNOWLEDGE PROOF ALGORITHM BASED ON PEDERSEN COMMITMENT

(71) Applicant: Zkrypto Inc., Seoul (KR)

(72) Inventor: Hyunok Oh, Seoul (KR)

(73) Assignee: Zkrypto Inc., Seoul (KR)

( * ) Notice: Subject to any disclaimer, the term of this patent is extended or adjusted under 35 U.S.C. 154(b) by 121 days.

(21) Appl. No.: 18/540,905

(22) Filed: Dec. 15, 2023

(65) Prior Publication Data

US 2025/0202706 A1      Jun. 19, 2025

(51) Int. Cl.
$$\begin{array}{ll} \textit{H04L 9/00} & (2022.01) \\ \textit{H04L 9/06} & (2006.01) \\ \textit{H04L 9/32} & (2006.01) \end{array}$$

(52) U.S. Cl.
CPC .......... *H04L 9/3221* (2013.01); *H04L 9/0643* (2013.01); *H04L 9/50* (2022.05); *G06Q 2220/00* (2013.01); *H04L 2209/56* (2013.01)

(58) Field of Classification Search
CPC ................................. H04L 9/50; H04L 9/3221
See application file for complete search history.

(56) References Cited

U.S. PATENT DOCUMENTS

2020/0052903 A1 *  2/2020  Lam ...................... H04L 9/3239
2020/0134625 A1    4/2020  Li et al.

2020/0136829 A1 *  4/2020  Keon .................... H04L 9/3236
2020/0175502 A1 *  6/2020  Ma ...................... G06Q 20/3676
2020/0175509 A1 *  6/2020  Qi ........................ G06Q 20/389
(Continued)

FOREIGN PATENT DOCUMENTS

JP        2021-518685 A      8/2021
WO      2023-120283 A1     6/2023

OTHER PUBLICATIONS

Fu, X. (2023). Instant Zero Knowledge Proof of Reserve. Cryptology EPrint Archive. https://eprint.iacr.org/archive/2023/1156/ 20230726:231905 (Year: 2023).*

(Continued)

*Primary Examiner* — William R Korzuch
*Assistant Examiner* — Aditya Sriram
(74) *Attorney, Agent, or Firm* — Nicholas Park

(57) ABSTRACT

The present invention relates to a method of contracting reserves using a Pedersen commitment and a method of proving reserves using a Pedersen commitment based zero-knowledge proof algorithm. The method of contracting reserves performed by at least one processor includes loading a reserve database in which a plurality of reserves corresponding to a plurality of accounts are stored; generating a plurality of commit values respectively corresponding to the plurality of accounts using a commit key and a plurality of random values; generating a transaction on a smart contract based on the generated plurality of commit values; calculating a total commit value based on the commit key, a total random value corresponding to a sum of the plurality of random values, and a total reserve; and generating a data set including the total commit value, the total reserve, and the commit key.

5 Claims, 10 Drawing Sheets

(56)          References Cited

U.S. PATENT DOCUMENTS

2020/0219099 A1*    7/2020    Mohassel ............. H04L 9/3218

OTHER PUBLICATIONS

Dagher, G. G., Benedikt Bünz, Bonneau, J., Clark, J., & Boneh, D. (2015). Provisions. Computer and Communications Security. https://doi.org/10.1145/2810103.2813674 (Year: 2015).*
EPO, European Search Report issued for European Patent Application No. 23220037.8-1218, Jun. 10, 2024.
Trevor Conley et al., Instant Zero Knowledge Proof of Reserve, IACR, International Association for Cryptologic Research, Dec. 17, 2023.
Gweonho Jeong et al., Azeroth: Auditable Zero-knowledge Transactions in Smart Contracts, IACR, International Association for Cryptologic Research, May 31, 2022.
Konstantinos Chalkias et al., Distributed Auditing Proofs of Liabilities, IACR, International Association for Cryptologic Research, Oct. 11, 2021.
JPO, Office Action issued for Japanese Patent Application No. 2023-218647, Jul. 11, 2024.

* cited by examiner

T330

Receive first proof value and second proof value — S331

Obtain first value — S332

Obtain hash value by hashing first value, commit key, and first proof value — S333

Prove integrity of total commit value based on whether result of calculating hash value, first value, and first proof value is equal to result of calculating commit key and second proof value — S334

METHOD OF CONTRACTING RESERVES USING PEDERSEN COMMITMENT AND METHOD OF PROVING RESERVES USING ZERO-KNOWLEDGE PROOF ALGORITHM BASED ON PEDERSEN COMMITMENT

BACKGROUND

Technical Field

The present invention relates to a method of contracting reserves using a Pedersen commitment and a method of proving reserves using a zero-knowledge proof algorithm based on a Pedersen commitment.

Background Art

In finance, a reserve refers to assets held by a company for various purposes, and generally includes purpose to maintain an amount that completely matches the customer deposit. Proof of Reserves (POR) is a term used to describe an independent audit conducted to ensure that the party being audited has sufficient reserve to protect all customer balances.

In the case of Proof of Reserves of the virtual asset, this means that the auditor confirms that the company's all-in assets match 100% of the customer's assets as indicated in the balance at the time of the audit, and the customer can be assured that the company's solvency and liquidity are sufficient and that funds can be withdrawn at any time if desired.

Proof of Reserves has a very important meaning in terms of strengthening trust by transparently disclosing information on the safety and availability of funds to customers and allowing all customers to prove their assets in Proof of Reserves through an encrypted method.

In the related art, Proof of Reserves is performed using a Merkle tree data structure, and in the case of the Merkle tree, a problem that a time required for reserve contract and proving is too long has occurred. Therefore, there is a need for a fast method of Proof of Reserves capable of replacing the Merkle tree.

SUMMARY

Technical Problem

An object of the present invention is to provide a method of contracting reserves using a Pedersen commitment.

Another object of the present invention is to provide a method of proving a contracted reserves using a Pedersen commitment.

Technical Solution

A method of contracting reserves performed by at least one processor according to an embodiment of the present disclosure may include: loading a reserve database in which a plurality of reserves corresponding to a plurality of accounts are stored; generating a plurality of commit values respectively corresponding to the plurality of accounts using a commit key and a plurality of random values; generating a transaction on a smart contract based on the generated plurality of commit values; obtaining a total commit value based on the commit key, a total random value corresponding to a sum of the plurality of random values, and a total reserve; and generating a data set including the total commit value, the total reserve, and the commit key.

According to an embodiment, the method of contracting reserves may further include signing the data set to a blockchain.

According to an embodiment, the method of contracting reserves may further include uploading the data set to a network.

According to an embodiment, the method of contracting reserves may further include: receiving a first reserve corresponding to a first account among the plurality of accounts; updating the reserve database using the first reserve; generating a first random value corresponding to the first account; generating a first commit value corresponding to the first account based on the first random value, the commit key, and the first reserve; and updating the smart contract using the first commit value.

According to an embodiment, the method of contracting reserves may further include updating the total random value based on the first random value, updating the total reserve, obtaining the total commit value based on the commit key, the updated total reserve, and the updated total random value, and generating a data set including the total commit value, the total reserve, and the commit key.

According to an embodiment, the generating of the plurality of commit values may include calculating each of the plurality of commit values in a form of a power of the reserve of the commit key and the random value.

According to an embodiment, the commit key $com_i$ may include a first key g and a second key h, and the generating of the plurality of commit values may include generating a commit value $com_i$ using the following equation with respect to a reserve mi and a random value ri corresponding to an ith (i is a natural number) account.

$$com_i = g^{r_i} \cdot h^{m_i}$$

According to an aspect of an exemplary embodiment, there is provided a method of proving reserves by using a zero-knowledge proof algorithm, the method including: obtaining a total commit value; obtaining a plurality of commit values respectively corresponding to a plurality of account owners from a plurality of account owners from a smart contract; proving integrity of the total commit value based on the plurality of commit values and the total commit value; and proving integrity of the first commit value based on a commit key, a first random value corresponding to a first user, a first reserve, and a first commit value.

According to an embodiment, the proving of the integrity of the total commit value may include multiplying all of the plurality of commit values, comparing the multiplied result value with the total commit value, and proving the integrity of the total commit value when the multiplied result value is equal to the total commit value as a result of the comparison.

According to an embodiment, the proving of the integrity of the total commit value may include: receiving a first proof value and a second proof value; obtaining a first value; obtaining a hash value by hashing the first value, the commit key, and the first proof value; and proving the integrity of the total commit value based on whether a result of calculating the hash value, the first value, and the first proof value is equal to a result of calculating the commit key and the second proof value.

According to an embodiment, the commit key includes a first key g and a second key h, and when a total reserve is TRsv and the total commit value is TCOM, a first value y is obtained by the following equation.

$$y = TCOM \cdot \left(g^{TRsv}\right)^{-1}$$

According to an embodiment, when it is assumed that the first proof value is t, the second proof value is s, and the hash value is c, when the following equation is satisfied, the total commit value may be determined to be appropriate.

$$h^s = y^c \cdot t$$

According to an embodiment, the proving of the integrity of the total commit value may be performed without a total random value used to calculate the total commit value.

According to an embodiment, the proving of the integrity of the first commit value may include obtaining the commit key, calculating a proof commit value based on the commit key, the first secret key, and a first reserve, and proving the integrity of the first commit value by comparing the proof commit value and a first commit value obtained from the smart contract.

According to an embodiment, when the integrity of the first commit value is proved, the first reserve proves that it is reflected in the total reserve.

According to an embodiment, the total commit value may be obtained from a blockchain network.

DETAILED DESCRIPTION

Figure 1:
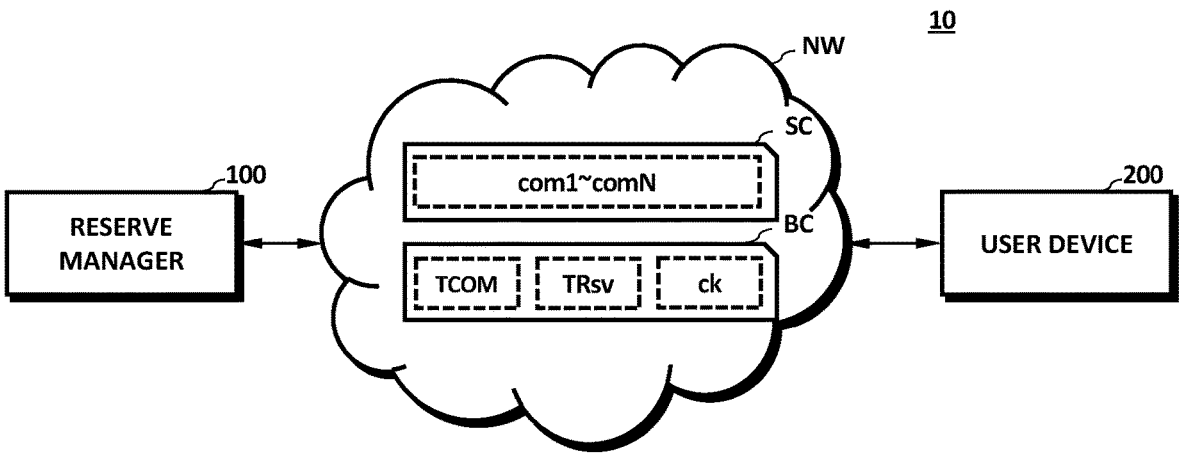
FIG. 1 is a block diagram illustrating a reserve managing system according to an example embodiment.

Hereinafter, exemplary embodiments of the present disclosure will be described in detail with reference to the accompanying drawings. Advantages and features of the present invention and methods of achieving the same will become apparent with reference to embodiments described in detail below together with the accompanying drawings. However, the technical spirit of the present invention is not limited to the following embodiments, but may be implemented in various different forms, and the following embodiments are provided to complete the technical spirit of the present invention and to completely inform a person having ordinary skill in the art to which the present invention belongs of the scope of the present invention, and the technical spirit of the present invention is only defined by the scope of Claims.

In adding reference numerals to elements in each drawing, it should be noted that the same elements will be designated by the same reference numerals, if possible, although they are shown in different drawings. In addition, in describing the present invention, when it is determined that a detailed description of related known components or functions may obscure the gist of the present invention, the detailed description thereof will be omitted.

Unless otherwise defined, all terms (including technical and scientific terms) used herein have the same meaning as commonly understood by one of ordinary skill in the art to which the inventive concept belongs. In addition, terms defined in commonly used dictionaries are not interpreted ideally or excessively unless they are clearly specifically defined. The terminology used herein is for the purpose of describing embodiments and is not intended to be limiting of the present invention. In the present specification, a singular form includes a plural form unless specifically mentioned in the text.

In addition, in describing the element of the present invention, terms such as first, second, A, B, (a), (b), and the like may be used. The term is used only to distinguish the element from other elements, and the nature, sequence, or order of the corresponding element is not limited by the term. When an element is described as being "connected," "coupled," or "connected" to another element, the element may be directly connected or connected to the other element, but it should be understood that another element may be "connected," "coupled," or "connected" between each element.

It will be further understood that the terms "comprises" and/or "comprising" used in the present invention do not preclude the presence or addition of one or more other elements, steps, operations, and/or elements in the presence of stated elements, steps, operations, and/or elements.

A component included in any one embodiment and an element including a common function may be described using the same name in another embodiment. Unless otherwise stated, the description described in any one embodiment may be applied to other embodiments, and a detailed description may be omitted within a redundant range or a range that can be clearly understood by a skilled person in the art in the art.

Hereinafter, some embodiments of the present invention will be described in detail with reference to the accompanying drawings.

Hereinafter, the present invention will be described in detail with reference to preferred embodiments of the present invention and the accompanying drawings.

FIG. 1 is a block diagram illustrating a reserve managing system according to an example embodiment.

Referring to FIG. 1, a reserve managing system 10 may perform a contract for a reserve, perform an audit or proof for the contracted reserve, and for this, may include a reserve manager 100, a network NW, and a user device 200. Although not illustrated, an audit terminal for reserve audit may be further included according to an embodiment.

The reserve manager 100 may be operated by an entrust institution that remits a reserve and manages the entrusted reserve, and in an example, the entrust institution may include a bank and an exchange. In addition, in the present specification, a reserve may refer to a financial asset or a physical asset deposited or entrusted to an entrust institution as an asset owned by the user, and in an embodiment, may refer to a deposit. The user device 200 may entrust a reserve owned by the user to an entrust institution operating the reserve manager 100.

The reserve manager 100 and the user device 200 may include various communication terminal devices such as a cellular phone, a smart phone, a laptop, a personal computer (PC), a navigation, a personal communication system (PCS), a global system for mobile communications (GSM), a personal digital cellular (PDC), a personal handphone system (PHS), a personal digital assistant (PDA), an international mobile telecommunication (IMT)-2000, a code division multiple access (CDMA)-2000, a W-code division multiple access (W-CDMA), a wireless band Internet (Wibro) terminal, a smart pad, a tablet PC, etc. In another example, the reserve manager 100 and the user device 200 may be implemented as a server.

The reserve manager 100 and the user device 200 may be connected to each other through a network NW that may communicate with each other by wire or wirelessly, and when they are connected to each other by wire, the network NW may use a serial method, and when they are connected wirelessly, the network NW may communicate with each other by using a wireless communication network. The wireless communication network includes, but is not limited to, a Local Area Network (LAN), a Wide Area Network (WAN), the World Wide Web (WWW), a wired/wireless data communication network, a telephone network, a wired/wireless television communication network, 3G, 4G, 5G, 3rd Generation Partnership Project (3GPP), 5th Generation Partnership Project (5GPP), Long Term Evolution (LTE), World Interoperability for Microwave Access (WIMAX), Wi-Fi, the Internet, a Local Area Network (LAN), a Wireless Local Area Network (Wireless LAN), a Wide Area Network (WAN), a Personal Area Network (PAN), a Radio Frequency (RF), a Bluetooth network, a Near-Field Communication (NFC) network, a satellite broadcasting network, an analog broadcast network, a Digital Multimedia Broadcasting (DMB) network, a Chain Network, and the like.

The user device 200 may have a unique account (for example, a bank account) and may deposit a reserve in its own account. In an embodiment, the user device 200 may deposit a reserve through the reserve manager 100 and the first network SC. In an embodiment, the first network SC may be a smart contract using a blockchain network.

The reserve manager 100 may obtain a commit value corresponding to a reserve based on the reserve managing of the user device 200. In the present specification, the commit value may mean a value converted in the form of a Pedersen Commit based on a reserve, a commit key ck, and a random value. In an embodiment, the reserve manager 100 may obtain the commit value $com_i$ by using Equation 1 below with respect to the reserve mi, the random value $r_i$, and the commit key g and h corresponding to the ith (i is a natural number) account of the user.

$$com_i = g^{r_i} \cdot h^{m_i} \qquad \text{[Equation 1]}$$

In an embodiment, the reserve manager 100 may generate a commit value $com_i$ and a proof by performing a zero-knowledge proof method during a contract process. In the present specification, the zero-knowledge proof method is a method of proving the integrity of a message without checking the message (for example, a reserve/commit value), and in one example, zero-knowledge SNARK (zk-SNARK) and commit carrying SNARK (cc-SNARK) may be used as the zero-knowledge proof method. In addition, a proof may indicate a value capable of proving whether a commit value $com_i$ is normally generated.

The reserve manager 100 may upload the obtained commit values com1 to comN to the first network SC. In an embodiment, the reserve manager 100 may sign the obtained commit values com1 to comN to the blocks on the smart contract.

The reserve manager 100 may calculate the total commit value TCOM by multiplying commit values of all users. In an embodiment, the total commit value TCOM may be calculated as Equation 2 below with respect to the total TRsv (the sum of all mi or the total reserve deposited in the reserve manager 100, the commit key g and h, and the total random value R (the sum of all $r_i$).

$$TCOM = \prod com_i = \prod g^{r_i} \cdot h^{m_i} = g^{\Sigma r_i} \cdot h^{\Sigma m_i} = g^R \cdot h^{TRsv} \qquad \text{[Equation 2]}$$

The reserve manager 100 may upload the calculated total commit value TCOM, total reserve TRsv, and commit key ck to the second network BC. In an embodiment, the second network BC may be a blockchain network, and the reserve manager 100 may fasten the total commit value TCOM, the total reserve TRsv, and the commit key ck on the blockchain network. In another embodiment, the second network BC may be the World Wide Web, and the reserve manager 100 may upload the commit value TCOM, the total reserve TRsv, and the commit key ck to a predetermined website.

According to the technical concept of the present disclosure, the reserve managing system 10 may upload a commit value in the Pedersen commitment form on the network NW. In addition, the reserve managing system 10 may prove whether the reserve manager 100 fully deposits the entire reserve by using the total commit value TCOM and the total reserve TRsv without exposing a random value, as will be described later, based on the addition homomorphic property of the Pedersen commitment type. According to this proof method, an audit function for the reserve manager 100 may be improved, and the reserve of the user device 200 may be fully entrusted.

In the present specification, the operation of the reserve manager 100 and the user device 200 may mean an operation performed by a processor included in each component, based on a computer program including at least one instruction stored in a storage device included in each component, and the storage device may include a non-volatile memory, a volatile memory, a flash memory, a hard disk drive (HDD), a solid state drive (SSD), or the like. The processor may include at least one of a Central Processing Unit (CPU), a Graphic Processing Unit (GPU), a Neural Processing Unit (NPU), a RAM, a ROM, a system bus, and an application processor.

Figure 2:
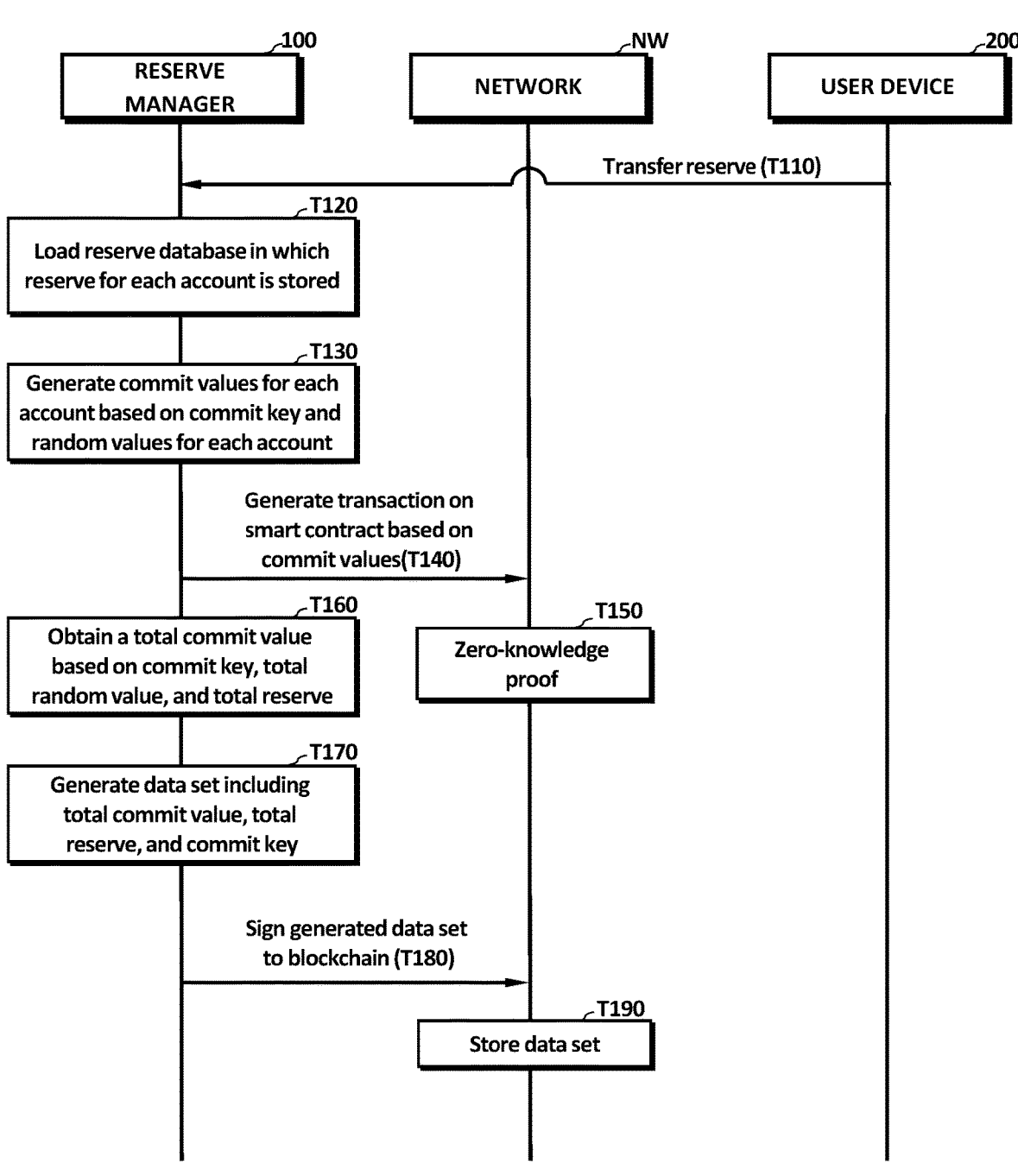
FIG. 2 is a diagram illustrating a reserve transaction method according to an example embodiment.

FIG. 2 is a diagram illustrating a reserve transaction method according to an example embodiment.

Referring to FIG. 2, the user device 200 may entrust a reserve to the reserve manager 100, step T110. In one example, the user device 200 may deposit the reserve to correspond to the account of the reserve manager 100 to remit the reserve.

The reserve manager 100 may load a reserve database in which the reserve for each account is stored, step T120. In an embodiment, the reserve database may store a reserve and a random value corresponding to an account.

The reserve manager 100 may generate commit values for each account based on the commit key and the random values for each account, step T130. In an embodiment, the commit key may be generated and distributed by a trusted authority (for example, various certification institution), and the reserve manager 100 may generate a commit value as shown in Equation 1 using the disclosed commit key, a random value, and a reserve.

The reserve manager 100 may generate a transaction on a smart contract based on the commit values, step T140. In an embodiment, the reserve manager 100 may generate a transaction by signing a new block to a smart contract based on commit values. Zero-knowledge proof may be performed on commit values corresponding to the generated transaction, step T150. In an embodiment, the zero-knowledge proof may be performed using the CC-SNARK with respect to a commit value that takes an exponential form by the Pedersen commitment form.

A high-speed CC-SNARK may be used by generating a transaction for a reserve by using a commit value in an exponential form with respect to the transaction according to an embodiment of the present disclosure, and as a result, fast proof and transaction may be possible.

The reserve manager 100 may calculate a total commit value TCOM based on the commit key ck, the total random value R, and the total reserve TRsv, step T160. In an embodiment, the reserve manager 100 may generate the total commit value TCOM by the method described above in Equation 2.

The reserve manager 100 may generate a data set including the total commit value TCOM, the total reserve TRsv, and the commit key ck, step T170. In an embodiment, the data set may further include a total random value R. The reserve manager 100 may fasten the generated data set to a blockchain, step T180. The network NW may store the data set, step T190.

According to an exemplary embodiment of the present disclosure, the reserve manager 100 may generate a commit value in the Pedersen format using the reserve and perform a zero-knowledge proof using the generated commit value, and thus an audit process of proving whether the reserve manager 100 keeps the reserve in its entirety may be performed at a high speed, and the reliability of the reserve managing of the user device 200 may be increased.

Figure 3:
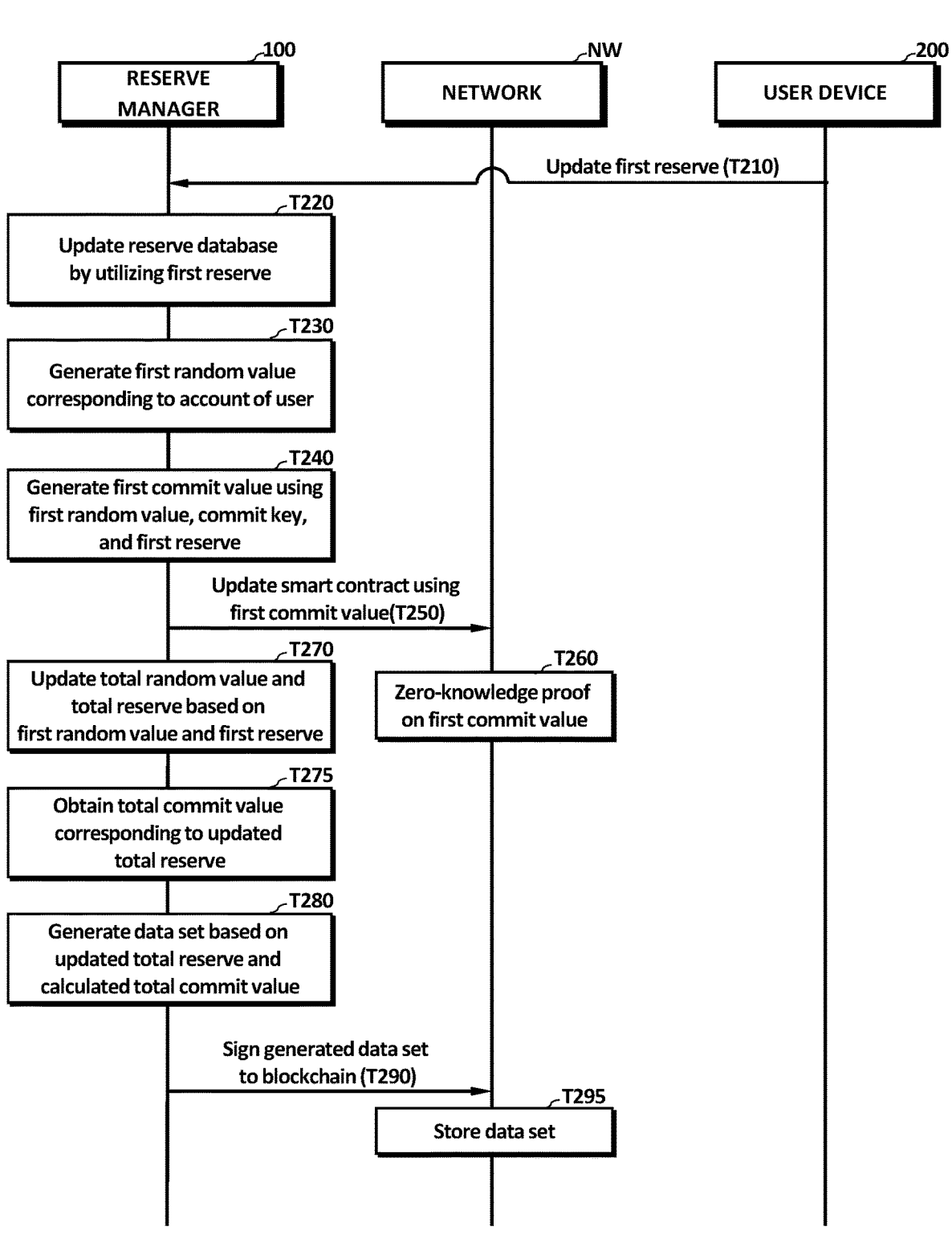
FIG. 3 is a diagram illustrating a reserve transaction method according to an example embodiment.

FIG. 3 is a diagram illustrating a reserve transaction method according to an example embodiment. In detail, FIG. 3 illustrates a reserve transaction method when a reserve is updated. Descriptions overlapping with those of FIG. 2 will be omitted.

Referring to FIG. 3, the user device 200 may update the first reserve corresponding to the account of the user device in the reserve manager 100, step T210. In an example, an operation of depositing an additional reserve of the user device 200 or withdrawing a previously deposited reserve may be included in an operation of updating a reserve.

The reserve manager 100 may update the reserve database by utilizing the first reserve, step T220. The reserve manager 100 may generate a first random value corresponding to the account of the user, step T230. In an embodiment, the reserve manager 100 may generate the first random value using a random number generator.

The reserve manager 100 may generate a first commit value using the first random value, the commit key, and the first reserve, step T240, and update the smart contract using the first commit value, step T250. Zero-knowledge proof may be performed on the first commit value, step T260. In an embodiment, the zero-knowledge proof may be performed by members included in the network NW.

The reserve manager 100 may update the total random value R and the total reserve TRsv based on the first random value and the first reserve, step T270. The reserve manager 100 may calculate a total commit value corresponding to the updated total reserve, step T275, and may generate a data set based on the updated total reserve and the calculated total commit value, step T280.

The reserve manager 100 may fasten the generated data set to the blockchain, step T290, and the network may store the data set, step T295.

Figure 4:
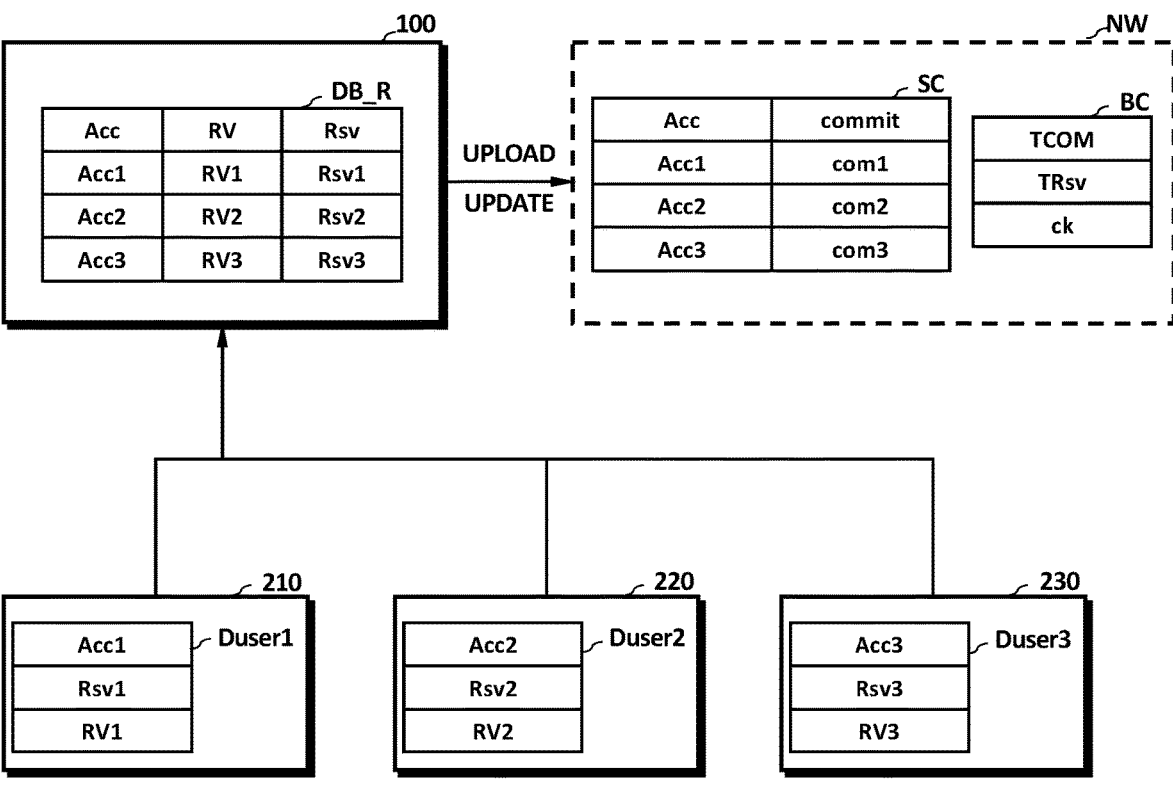
FIG. 4 is a diagram illustrating a method of contracting reserves according to an example embodiment.

FIG. 4 is a diagram illustrating a method of contracting reserves according to an example embodiment.

Referring to FIG. 4, the reserve manager 100 may store a reserve database DB_R. The reserve database DB_R may store a random value RV and a reserve Rsv for each account Acc of the user. In the example of FIG. 4, the first user 210 may be entrusted with a first reserve Rsv1, and a first random value RV1 randomly generated and the first reserve Rsv1 may be matched to a first account Acc1 corresponding to the first user 210. Also, the second user 220 may be entrusted with the second reserve Rsv2, and the second random value RV2 randomly generated and the second reserve Rsv2 may be matched to the second account Acc2 corresponding to the second user 220. Similarly, the third user 230 may be entrusted with the third reserve Rsv3, and a third random value RV3 randomly generated may match the third reserve Rsv3 in the third account Acc3 corresponding to the third user 230.

In addition, the plurality of users 210 to 230 may autonomously store an account, a reserve, and a random value. In an example, the first user 210 may store the first reserve Rsv1 and the first random value RV1 to correspond to the first account Acc1, the second user 220 may store the second reserve Rsv2 and the second random value RV2 to correspond to the second account Acc2, and the third user 230 may store the third reserve Rsv3 and the third random value RV3 to correspond to the third account Acc3.

The reserve manager 100 may obtain a plurality of commit values com1 to com3 based on the reserve Rsv and the random value RV, and upload or update the plurality of commit values com1 to com3 to the first network SC as a result of performing a contract with the plurality of users 210 to 230. In addition, the reserve manager 100 may generate the total commit value TCOM as a result of multiplying the plurality of commit values com1 to com3, generate the total reserve TRsv as a result of adding the plurality of reserve values Rsv1 to Rsv3, and upload or update the total commit value TCOM, the total reserve TRsv, and the commit key ck to the second network BC.

Although FIG. 4 illustrates an example in which a reserve is entrusted by three user devices, this is merely an example, and it is apparent that the technical idea of the present disclosure may also be applied to an example in which a reserve is entrusted by more or less than three user devices.

Figure 5:
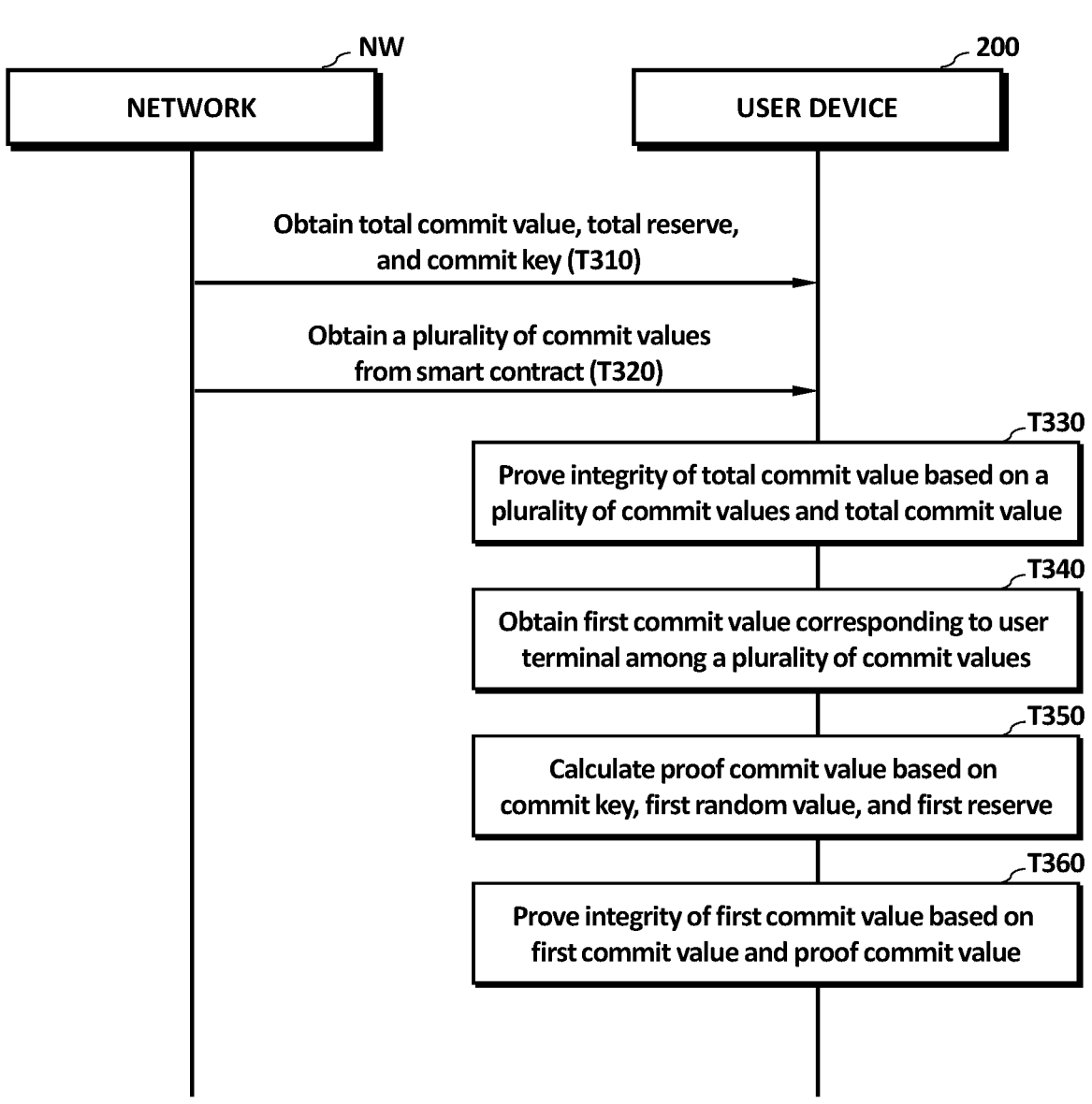
FIG. 5 is a flowchart illustrating a method of proving reserves according to an example embodiment.

FIG. 5 is a flowchart illustrating a method of proving reserves according to an example embodiment.

Referring to FIG. 5, the user device 200 may obtain the total commit value TCOM, the total reserve TRsv, and the commit key ck from the network NW, step T310. In an embodiment, the user device 200 may parse the total commit value TCOM, the total reserve TRsv, and the commit key ck from the data set fastened to the blockchain network. The user device 200 may obtain a plurality of commit values com1 to comN from the smart contract, step T320.

The user device 200 may prove the integrity of the total commit value TCOM based on the plurality of commit values com1 to comN and the total commit value TCOM, step T330. In an embodiment, the user device 200 may prove the integrity of the total commit value TCOM based on whether a value obtained by multiplying the plurality of commit values com1 to comN obtained from the smart contract is equal to the total commit value TCOM.

When the sum of the reservoirs deposited by all users is equal to the total reservoirs held by the reserve manager 100, it may be proved that the reserve manager 100 keeps all the reservoirs without omission of the reservoirs. In addition, according to the property of a commit including an exponent of a reservoir and a random value, a product of respective commit values should be equal to a commit value for the entire reservoir according to the exponential law. According to an exemplary embodiment of the present disclosure, the integrity proof of the entire reservoir may be performed using the commit values com1 to comN and the total commit value TCOM, thereby simply performing the proof of the reservoir, and as the reserve proof is performed, the assets of the user device 200 may be safely protected.

The detailed steps of the method, step T330 for proving integrity of the total commit value will be described in detail later with reference to FIGS. 7 to 9.

In FIG. 5, the integrity proof, step T330, of the total commit value is illustrated as being performed by the user device, but this is an example, and the integrity proof, step T330, of the total commit value may be performed by an audit terminal (not shown) performed by an audit agency that performs an audit on the reserve manager 100.

The user device 200 may perform integrity proof of the user assets in addition to integrity proof of the total commit value. In the present specification, the user asset may mean a reserve entrusted by the user himself or herself, and may be performed by the individual user device 200.

In detail, the user device 200 may obtain the first commit value com1 corresponding to the user device 200 among the plurality of commit values com1 to comN from the smart contract, step T340. The user device 200 may calculate a proof commit value based on the commit key (including ck, the first key g, and the second key h), the first random value RV1, and the first reserve Rsv1, managed by the user device itself, step T350. In an embodiment, the proof commit value comv may be calculated according to Equation 3 below.

$$com_v = g^{RV_1} \cdot h^{Rsv_1} \qquad \text{[Equation 3]}$$

The user device 200 may prove the integrity of the first commit value com1 based on whether the proof commit value comv is equal to the first commit value com1, step T360.

According to an exemplary embodiment of the present disclosure, the user device 200 may not disclose the amount of the reserve, and may confirm whether its reserve is accurately deposited based on the disclosed commit value instead of the reserve. As a result, according to the method of proving reserves, it is possible to check whether the user's assets are fully remitted without disclosing the reserve, which is the user's personal information, and to efficiently perform the audit function for the reserve manager 100.

In an embodiment, the user device 200 may additionally check whether the first commit value com1 is a properly generated value by performing the zero-knowledge proof algorithm for the first commit value com1.

Figure 6:
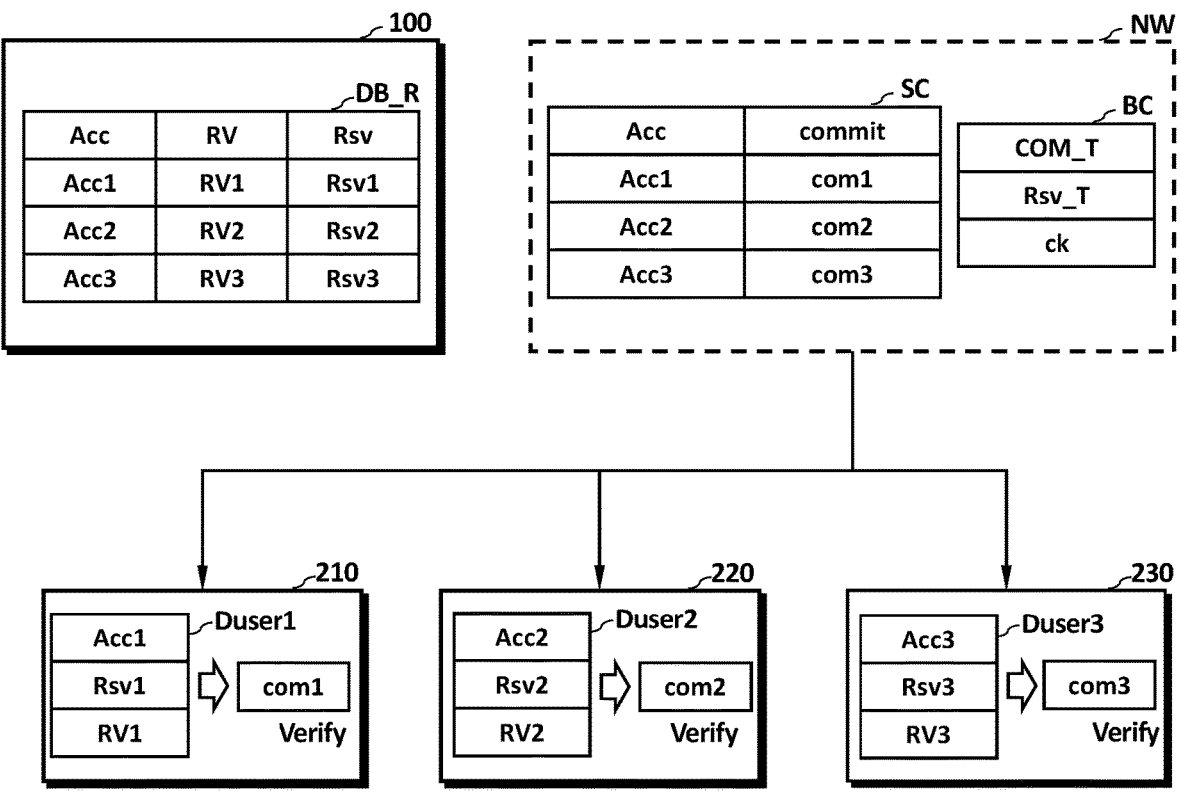
FIG. 6 is a diagram illustrating a method of proving reserves according to an example embodiment.

FIG. 6 is a diagram illustrating a method of proving reserves according to an example embodiment. In detail, FIG. 6 illustrates in detail the integrity proof, step T340 to T360, of the commit value of the user. Descriptions overlapping with those of FIG. 4 will be omitted.

Referring to FIG. 6, the first user 210 may obtain a first commit value com1 corresponding to the first account Acc1 of the first user 210 from the smart contract sc. The first user 210 may calculate the proof commit value comv based on the user data Duser1. In an example, the first user 210 may calculate a proof commit value based on Equation 3.

The first commit value com1 is a value generated by the reserve manager 100 based on the first random value RV and the first reserve Rsv, and the first reserve Rsv cannot be extracted from the first commit value com1 without exposing the first random value RV. That is, according to an embodiment of the disclosure, the encrypted first commit value com1 may be disclosed instead of the first reserve Rsv corresponding to the personal information, and the proof operation may be performed using the first commit value com1.

In addition, since the first commit value com1 is a value generated based on the reserve amount deposited in the reserve manager 100 and the proof commit value comv is a value generated based on the amount recorded as being deposited by the first user 210, the two values should be the same when the reserve is normally deposited. Accordingly, the first user 210 may prove the first commit value com1 by comparing the proof commit value with the first commit value com1. Similarly, the second user 220 and the third user 230 may prove the second commit value com2 and the third commit value com3, respectively. According to an embodiment of the present disclosure, it is possible to prove whether a user's asset is well deposited by comparing a commit value with a proof commit value without using a reserve, and the user's asset may be effectively protected according to the proof procedure.

Figure 7:
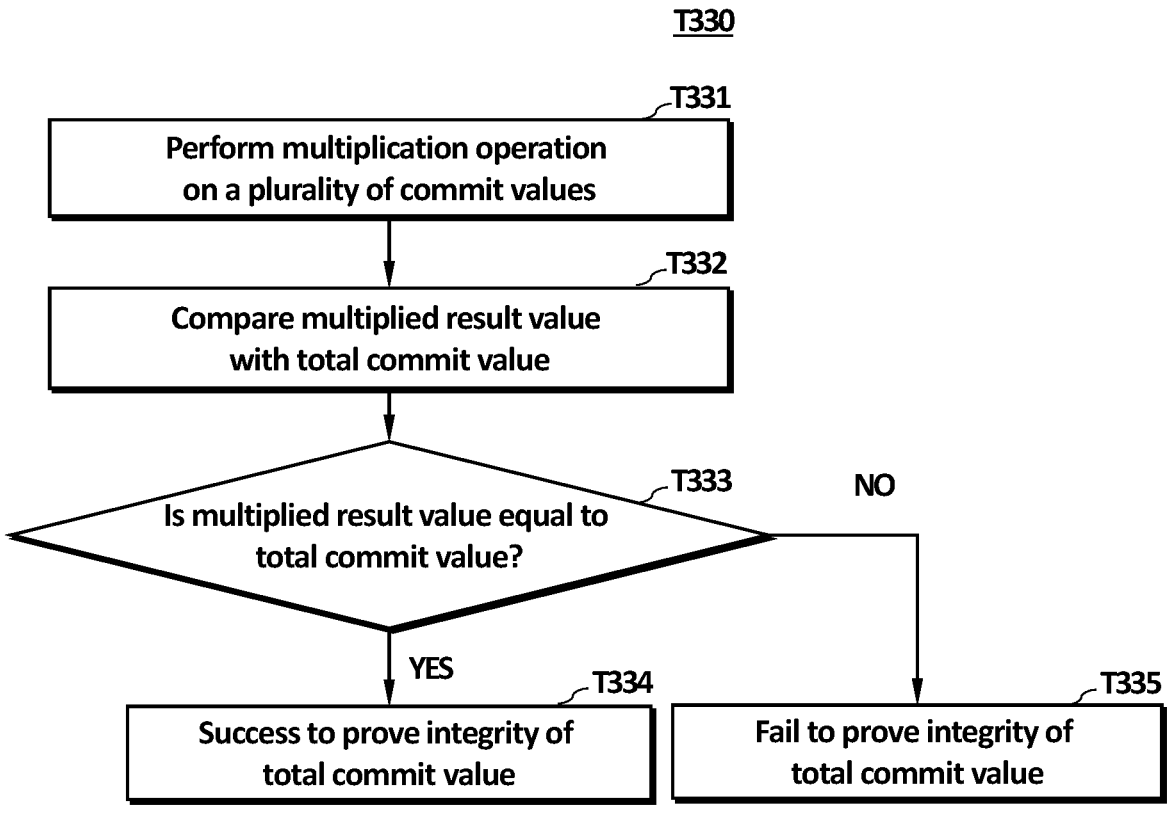
FIG. 7 is a flowchart illustrating a method of proving reserves according to an example embodiment.

FIG. 7 is a flowchart illustrating a method of proving reserves according to an example embodiment. In detail, FIG. 7 illustrates the integrity proof, step T330, of the total commit value in detail.

Referring to FIG. 7, the user device 200 may perform a multiplication operation on a plurality of commit values, step T331. As described in Equation 2, when the total reserve TRsv is equal to the amount deposited by all users, the sum of the commit values of all users based on the homomorphic property of the Pedersen commitment should be equal to the total commit value TCOM determined based on the total reserve TRsv.

The user device 200 may compare the multiplied result value with the total commit value TCOM, step T332. When the multiplied result value is equal to the total commit value, step T333, the user device 200 may determine that the integrity proof of the total commit value TCOM is successful, step T334, and when the multiplied result value is not equal to the total commit value, step T333, the user device 200 may determine that the integrity proof of the total commit value TCOM fails, step T335.

According to an embodiment of the present disclosure, by proving the total commit value by utilizing the properties of the Pedersen commitment, it is possible to prove whether all the reserves are fully remitted, and as a result, it is possible to perform high-speed proving on the reserves.

Figure 8:
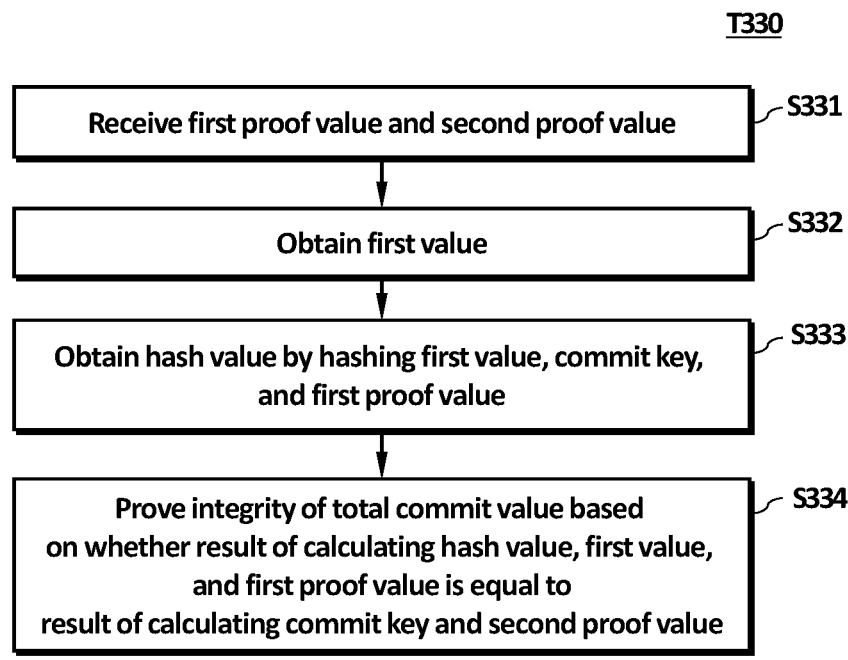
FIG. 8 is a flowchart illustrating a method of proving reserves according to an example embodiment.

FIG. 8 is a flowchart illustrating a method of proving reserves according to an example embodiment. In detail, FIG. 8 illustrates the integrity proof, step T330, of the total commit value in detail.

Referring to FIG. 8, the user device 200 may receive a first proof value and a second proof value, step S331. In an embodiment, the first proof value t and the second proof value s may be generated by the reserve manager 100 or a proof institution.

In an embodiment of the present invention, the first proof value t and the second proof value s for the commit key g and h, the arbitrary integer a, the total random value RV, the total commit value TCOM, the total reserve TRsv, and the first value y may be generated as in Equation 4 below. (Hash means Hash function)

$$t = h^a \qquad \text{[Equation 4]}$$
$$y = TCOM \cdot \left(g^{TRsv}\right)^{-1}$$
$$c = hash(h, y, t)$$
$$s = a + c \cdot RV$$

The user device 200 may obtain a first value y, step S332. In an embodiment, the user device 200 may obtain the first value y through a certification institution or a supervisory institution.

The user device 200 may obtain the hash value c by hashing the first value y, the commit key g, h, and the first proof value t, step S333. The user device 200 may prove integrity of the total commit value based on whether a result of calculating the hash value c, the first value y, and the first proof value t is the same as a result of calculating the commit key g, h and the second proof value s, step S334. In an embodiment, the user device 200 may determine the integrity of the total commit value based on whether the total commit value satisfies Equation 5 below.

$$h^s = y^c \cdot t \qquad \text{[Equation 5]}$$

According to an exemplary embodiment of the present disclosure, the integrity of the total commit value TCOM may be determined by using the first value y instead of the random value RV, and accordingly, an asset leakage accident that may occur due to the exposure of the random value RV may be prevented, and as a result, the safety of the reserve managing system 10 may be increased.

Figure 9:
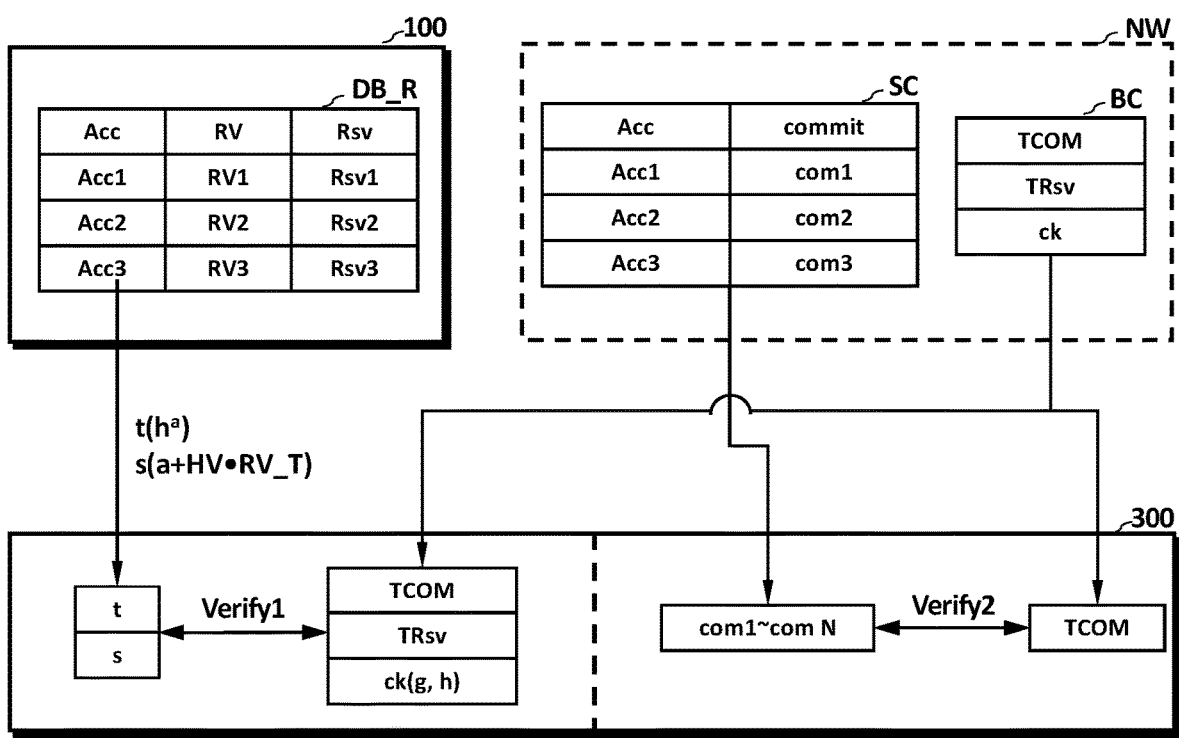
FIG. 9 is a diagram illustrating a method of proving reserves according to an example embodiment.

FIG. 9 is a diagram illustrating a method of proving reserves according to an example embodiment. In detail, FIG. 9 illustrates an integrity proof, step T330, of the total commit value in detail. Descriptions overlapping with those of FIG. 4 will be omitted.

Referring to FIG. 9, the audit terminal 300 may receive the first proof value t and the second proof value s generated based on Equation 4 from the reserve manager 100. In addition, the audit terminal 300 may obtain the total commit value TCOM, the total reserve TRsv, and the commit key ck from the second network BC. In addition, the audit terminal 300 may additionally obtain a first value y from a supervisory authority, or the like. In another embodiment, the audit terminal 300 may obtain the first value y based on the consolidation commit value TCOM, the consolidation reserve TRsv, and the commit key ck based on Equation 4.

The audit terminal 300 may obtain the hash value c based on the first key h, the first value, and the first proof value t, and may primarily prove the consolidation commit value TCOM based on whether the hash value c, the first key h, the first value y, the first proof value t, and the second proof value s satisfy Equation 5.

The audit terminal 300 may obtain the plurality of commit values com1 to com3 from the smart contract sc and may obtain the total commit value TCOM from the second network BC. The audit terminal 300 may secondarily prove the integrity of the total commit value by comparing the product of the plurality of commit values com1 to com3 and the total commit value TCOM based on Equation 2.

According to the exemplary embodiment of the present disclosure, as the audit terminal 300 secondly proves the Pedersen commitment based on the commit value of the Pedersen commitment form, the CC-SNARK, which is a high-speed zero-knowledge proof, may be used, and as a result, the high-speed proof may be performed. In addition, the audit terminal 300 may prove using the commit values com1 to comN and the first value y instead of the random value, thereby preventing the random value from being exposed to the outside, and as a result, the stability of the reserve managing system 10 may be improved.

Figure 10:
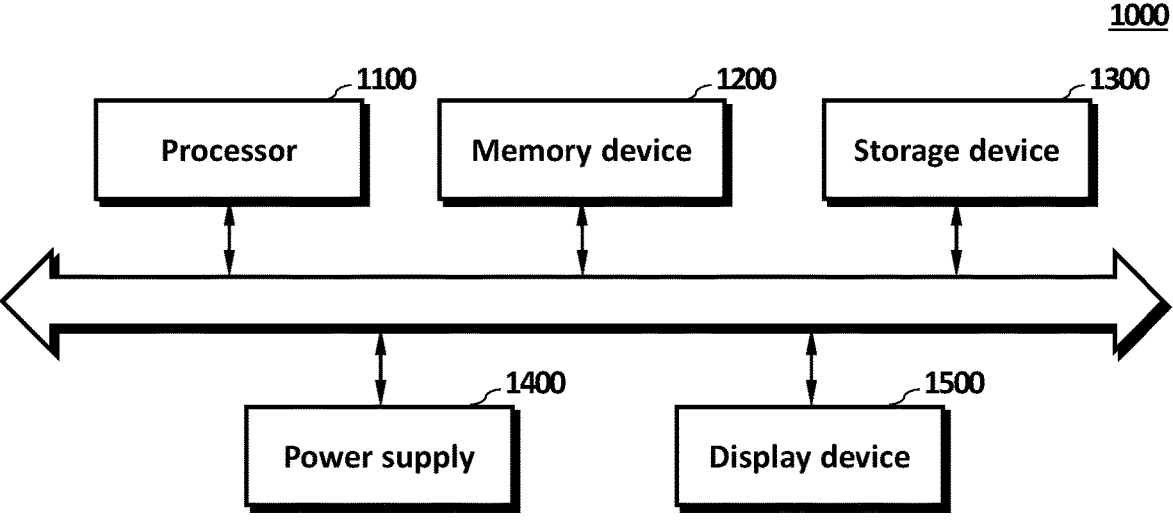
FIG. 10 is a block diagram illustrating a computing system according to an example embodiment.

FIG. 10 is a block diagram illustrating a computing system according to an example embodiment.

Referring to FIG. 10, the computing system 1000 may include one of the reserve managers 100 and the user device 200, and may include a processor 1100, a memory device 1200, a storage device 1300, a power supply 1400, and a display device 1500. Although not illustrated in FIG. 10, the computing system 1000 may further include ports for communicating with a video card, a sound card, a memory card, a universal serial bus (USB) device, other electronic devices, etc.

As described above, the processor 1100, the memory device 1200, the storage device 1300, the power supply 1400, and the display device 1500 included in the computing system 1000 may configure any one of the reserve managers 100 and the user device 200 according to embodiments of the inventive concept to perform a method of contracting reserves and a method of proving reserves. In detail, the processor 1100 may perform the method of contracting reserves and the method of proving reserves described with reference to FIGS. 1 to 9 by controlling the memory device 1200, the storage device 1300, the power supply 1400, and the display device 1500.

The processor 1100 may perform various computations or tasks. The processor 1100 may be a microprocessor or a Central Processing Unit (CPU). The processor 1100 may communicate with the memory device 1200, the storage device 1300, and the display device 1500 through a bus 1600 such as an address bus, a control bus, or a data bus. According to an embodiment, the processor 1100 may be connected to an expansion bus such as a Peripheral Component Interconnect (PCI) bus.

The memory device 1200 may store data necessary for an operation of the computing system 1000. For example, the memory device 1200 may be implemented as a DRAM, a mobile DRAM, an SRAM, a PRAM, an FRAM, an RRAM, and/or an MRAM. The storage device 1300 may include a solid state drive, a hard disk drive, a CD-ROM, etc. The storage device 1300 may store programs, application program data, system data, operating system data, etc., which are related to the method of contracting reserves and the method of proving reserves described with reference to FIGS. 1 to 10.

The display apparatus 1500 is an output means for notifying a user, and may notify a user or the like of information on a method of forming a virtual private network by displaying the information on the method. The power supply 1400 may supply an operating voltage required for an operation of the computing system 1000.

According to the technical concept of the present invention, by performing a Pedersen commitment to contract a reserve and performing a proof for the reserve using the properties of the Pedersen commitment, the contract and the proof can be performed without exposing personal information of a user (for example, a reserve balance of an individual user) in the proof process, and the proof can be performed at a high speed according to the properties of the Pedersen commitment.

Exemplary embodiments have been invented in the drawings and specification as described above. Although the embodiments are described using specific terms in the present specification, they are used only for the purpose of describing the technical spirit of the present invention and are not used to limit the meaning or the scope of the present invention described in Claims. Therefore, those skilled in the art will understand that various modifications and other equivalent embodiments are possible therefrom. Therefore, the true technical protection scope of the present invention should be determined by the technical spirit of the appended claims.

This work (Patent) was supported by Institute of Information & communications Technology Planning & Evaluation (IITP) grant funded by the Korea Government (MSIT) (No. 2021-0-00532-003, Project Name: Blockchain Technology Development for IITP Data Economy, Task Name: Blockchain scalability solutions supporting high performance/capacity transactions, Contribution Rate: 100%)

What is claimed is:

1. A method of contracting reserves performed by at least one processor, the method comprising:

loading a reserve database in which a plurality of reserves corresponding to a plurality of accounts are stored;

generating a plurality of commit values respectively corresponding to the plurality of accounts in Pedersen commitment form using a commit key and a plurality of random values;

generating a transaction on a smart contract based on the generated plurality of commit values;

obtaining a total commit value based on the commit key, a total random value corresponding to a sum of the plurality of random values, and a total reserve;

generating a data set including the total commit value, the total reserve, and the commit key;

uploading the data set on a blockchain network;

proving integrity of the total commit value based on a first value instead of the plurality of random values by the blockchain network; and depositing the plurality of reserves to the plurality of accounts when the integrity of the total commit value is proved, wherein the first value is determined as $\mathrm{TCOM} \cdot (g^{TRsv})^{-1}$, when the commit key is g, the total reserve is TRsv, and the total commit value is TCOM.

2. The method of claim 1, further comprising:

receiving a first reserve corresponding to a first account among the plurality of accounts; updating the reserve database using the first reserve;

generating a first random value corresponding to the first account;

generating a first commit value corresponding to the first account based on the first random value, the commit key, and the first reserve; and updating the smart contract using the first commit value.

3. The method of claim 2, further comprising:

updating the total random value based on the first random value;

updating the total reserve;

obtaining the total commit value based on the commit key, the updated total reserve, and the updated total random value; and generating a data set including the total commit value, the updated total reserve, and the commit key.

4. The method of claim 1, wherein the generating of the plurality of commit values comprises calculating each of the plurality of commit values in a form of an exponent of the reserve and a random value of the commit key.

5. The method of claim 4, wherein the commit key comprises a first key g and a second key h, and the generating of the plurality of commit values comprises generating a commit value $com_i$ using the following equation $com_i = g^{r_i} \cdot h^{m_i}$ for a reserve $m_i$ and a random value $r_i$ corresponding to an i-th (i is a natural number) account.

* * * * *